United States Patent
De Perthuis et al.

(10) Patent No.: US 7,689,781 B2
(45) Date of Patent: Mar. 30, 2010

(54) ACCESS TO A COLLECTIVE RESOURCE IN WHICH LOW PRIORITY FUNCTIONS ARE GROUPED, READ ACCESSES OF THE GROUP BEING GIVEN HIGHER PRIORITY THAN WRITE ACCESSES OF THE GROUP

(75) Inventors: Hugues De Perthuis, Garcelles (FR); Eric Desmicht, Caen (FR)

(73) Assignee: NXP B.V., Eindhoven (NL)

( * ) Notice: Subject to any disclaimer, the term of this patent is extended or adjusted under 35 U.S.C. 154(b) by 859 days.

(21) Appl. No.: 10/372,545

(22) Filed: Feb. 24, 2003

(65) Prior Publication Data

US 2003/0233338 A1 Dec. 18, 2003

(30) Foreign Application Priority Data

Feb. 26, 2002 (FR) .................................. 02 02398

(51) Int. Cl.
*G06F 12/00* (2006.01)
(52) U.S. Cl. .................................................. 711/151
(58) Field of Classification Search ............. 710/40, 710/46, 52, 113, 309, 240, 241, 242, 244; 711/151, 150, 158; 365/189.01
See application file for complete search history.

(56) References Cited

U.S. PATENT DOCUMENTS

| | | | |
|---|---|---|---|
| 5,136,582 A * | 8/1992 | Firoozmand | 370/400 |
| 5,438,459 A * | 8/1995 | Suga et al. | 386/2 |
| 5,450,564 A * | 9/1995 | Hassler et al. | 711/158 |
| 5,649,157 A | 7/1997 | Williams | |
| 5,809,278 A | 9/1998 | Watanabe et al. | |
| 5,904,732 A * | 5/1999 | Greenley et al. | 710/57 |
| 5,948,081 A | 9/1999 | Foster | 710/40 |
| 6,092,158 A | 7/2000 | Harriman et al. | 711/151 |
| 6,505,265 B1 * | 1/2003 | Ishikawa et al. | 710/113 |
| 6,865,635 B1 | 3/2005 | Nouvet et al. | |
| 2004/0172631 A1 * | 9/2004 | Howard | 718/100 |

FOREIGN PATENT DOCUMENTS

| | | |
|---|---|---|
| CN | 1286435 | 3/2001 |
| EP | 1081603 | 3/2001 |
| JP | 62-57050 A | 3/1987 |
| JP | 64-61846 A | 3/1989 |
| JP | 07-200386 A | 8/1995 |
| JP | 11-175464 A | 7/1999 |

OTHER PUBLICATIONS

Tanenbaum, "Structured Computer Organization", © 1984 Prentice-Hall, Inc., p. 10-12.*

* cited by examiner

*Primary Examiner*—Brian R Peugh

(57) ABSTRACT

The invention relates to a functional system comprising a set of functions (F, F') which are to access a collective resource (RSRC), the system including an interface (INT) arranged to implement an access scheme (AS) including at least one state (I) defined by an order of priority for an arbitration according to which the functions (F, F') can access the collective resource (RSRC), the state (I) being characterized in that, for at least one set of at least two functions (F), the access possibilities in read mode (F_R) and the access possibilities in write mode (F_W) have different priority levels, the access possibilities in read mode having consecutive priority levels higher than the priority levels of the access possibilities in write mode.

12 Claims, 5 Drawing Sheets

ACCESS TO A COLLECTIVE RESOURCE IN WHICH LOW PRIORITY FUNCTIONS ARE GROUPED, READ ACCESSES OF THE GROUP BEING GIVEN HIGHER PRIORITY THAN WRITE ACCESSES OF THE GROUP

FIELD OF THE INVENTION

The invention relates to access to a collective resource by a set of functions. More particularly, the invention relates to schemes for access to a collective resource in order of priority. In practice, the invention relates to a functional system comprising a set of functions which are to access a collective resource. The invention can be applied, for example, in a data processing device comprising several processors which are to access a collective memory. An MPEG decoder is for example such a device (MPEG is the abbreviation of Moving Picture Expert Group).

BACKGROUND OF THE INVENTION

It is possible to manage access to a collective resource by means of an interface. The interface uses an access scheme according to which the functions can access the collective resource.

One possible access scheme is characterized by an order of priority. A function must make a request to access the collective resource. The interface collects all the requests. Amongst the functions having a current request, it enables the function having the highest priority to access the collective resource. Assume once again that a functional system comprises three functions A, B and C. The order of priority may be A, B, C. In this case, function A will have access to the collective resource independently of the fact that a request from function B or C is current. Function B would have access to the collective resource provided that a request from function A is not current. Function C would have access to the resource provided that a request from function A or B is not current. Such an access scheme will be referred hereinafter as a priority access scheme.

The priority access scheme is mentioned in European patent application published under the number 1081603-A1. In principle, each function must have sufficient access to the collective resource for it to be able to be implemented correctly. Access of any function to the collective resource is determined by two factors: firstly, the access capacity offered by the collective resource and secondly the access scheme applied.

In principle it is possible to guarantee sufficient access to each function by ensuring that the collective resource offers a relatively high access capacity. However, the greater the access capacity (bandwidth, speed) offered by the collective resource, the more expensive the collective resource will in general be.

The requirement for access of a function may vary over time. It is possible that another function may need to access the collective resource intensively during a certain period and that this function does not require such an intensity of access during another period. The priority access scheme gives access to the collective resource on demand. This scheme therefore affords flexibility and consequently more effective use of the collective resource. The priority access scheme in fact requires less access capacity for the collective resource compared with a fixed access scheme in which the access model comprises several intervals of time each allocated to a certain function. Consequently the priority access scheme in principle affords a reduction in cost with regard to the collective resource.

SUMMARY OF THE INVENTION

However, the priority access scheme has certain drawbacks which the invention takes into consideration. It will generally be difficult to check whether each function has sufficient access to the collective resource and to check whether a function always has access within a critical time period following a request. Complex calculations of simulations of a statistical nature are necessary to check whether a certain priority access scheme affords correct functioning. Per se, this already gives rise to a certain amount of development cost.

The following example illustrates a problem of blocking which may occur with a priority scheme. There are three functions A, B and C in order of priority. At a certain moment, function A has access to the collective resource. During this access, functions B and C make a request. Access by function A being completed, function B will have access to the collective resource. The request from function C remains waiting. Function A presents a request during the access of function B to the collective resource. This is often the case when the data are processed by function A and then sent, after a certain processing time, for writing in the collective resource. Access by function B being terminated, function A will once again have access to the collective resource. If this continues, function A makes a request during access by function B and vice-versa, and function C will effectively be blocked for access to the collective resource. This blocking will last until function A or B, or both, reduce the frequency of their requests.

In addition it will be noted that, with such a blocking, function A finishes its task first and then function B, and when function C accesses the collective resource it may not be in a position to use the entire bandwidth offered to it. As a result the available accesses are poorly distributed for these three functions.

One aim of the invention is to allow better use of the collective resource and consequently a reduction in cost.

According to the invention (FIG. 9), a system as defined in the introductory paragraph comprises an interface (INT) arranged to implement an access scheme (AS) including at least one state (I) defined by an order of priority for arbitration according to which the functions (F, F') can access the collective resource (RSRC), the state (I) being characterized in that, for at least one set of at least two functions (F), the access possibilities in read mode (F_R) and the access possibilities in write mode (F_W) have different priority levels, the access possibilities in read mode having consecutive priority levels higher than the priority levels of the access possibilities in write mode.

Thus the invention guarantees that the functions will have different behaviors in reading and writing. This makes it possible to regulate the execution of the functions and to distribute the accesses by using in particular the duration of the data processing. This is because, the priority levels in the read mode being higher than those in write mode, the functions each receive the data to be processed before any output of processed data for writing to the collective resource. Thus the invention enables the functions as far as possible to have data to be processed continuously and in parallel and enables them to exploit their access in a more predictable way since the output of the processed data is limited and therefore regulated by the accesses in write mode to the collective resource.

In an advantageous embodiment, several states (I) are run through, a state (I) being defined by an order of priority in which at least one priority level constitutes an access possibility for one of the functions belonging to a subset of functions sharing the same priority level on several states (I). Thus it is possible, in a preferred embodiment, for one and the same priority level to constitute an access possibility in shared write mode, while running through several states (I), between the access possibilities in write mode of a subset of functions.

This enables the functions to work in parallel without causing any blockage. Advantageously, when the interface jumps from a state (I) in which the access possibility is offered to one of the functions of the subset of functions in the arbitration according to the order of priority, to a following state, the possibility of access is offered to another of the functions of said subset. Thus, whether a function of the subset having a common priority level makes an access or does not make it, the following function of the subset can profit from the access possibility without there being any blockage. The invention therefore affords better use of the memory. Consequently this enables the collective resource to have reduced access capacity compared with the fixed access scheme. Consequently the invention affords a reduction in cost compared with the fixed access scheme.

The invention will be further described with reference to examples of embodiments shown in the drawing to which, however, the invention is not restricted.

DESCRIPTION OF PREFERRED EMBODIMENTS

The following remarks relate to the reference signs. Similar entities are designated by a reference by a identical letters in all the figures. Several similar entities may appear in a single figure. In this case, a number or a suffix is added to the reference by letters in order to distinguish similar entities. The number or the suffix may be omitted for reasons of convenience. This applies to the description and to the claims.

Figure 1:
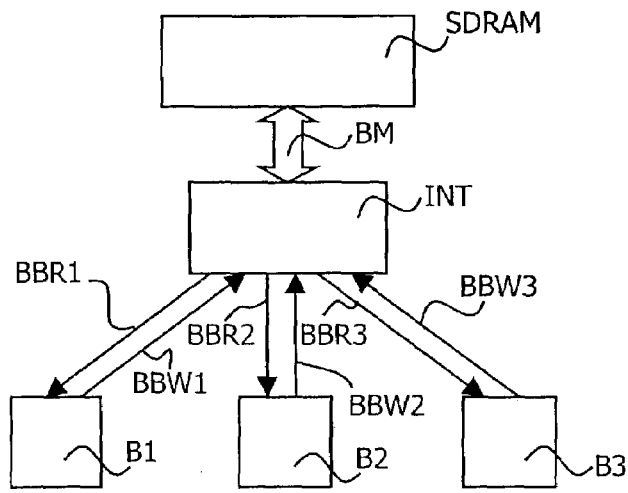
FIG. 1 illustrates a signal processing device according to the invention.

FIG. 1 illustrates a data processing device. The device comprises a collective memory SDRAM, a memory interface INT and three data processing units B1, B2 and B3. The latter will be referred to as a "unit" in the remainder of the description. Each unit B is connected to the memory interface INT via a private reading bus BBR and a private writing bus BBW. Each private reading bus BBR and each private writing bus BBW is dedicated to a certain unit B. The memory interface INT is connected to the collective memory SDRAM via a collective bus BM. The units B, the private reading buses BBR, the private writing buses BBW and the memory interface INT can form part of a single integrated circuit whilst the collective memory SDRAM is an external circuit.

The data processing device functions overall as follows. As a general rule, the units B receive on request data to be processed which are stored in the collective memory SDRAM. After having processed these data, the units B send the processed data to the collective memory SDRAM via the memory interface INT. The memory interface INT regularizes access to the collective memory SDRAM by the various units B.

The memory interface INT has two basic functions. Firstly, it performs arbitration between the various units B with regard to the access to the collective memory SDRAM. Only one unit B can access the collective memory SDRAM at a time, either in write or read mode. This means that a unit B can access the memory only in burst mode. Secondly, in the case of reading, the memory interface INT converts the data bursts coming from the collective memory SDRAM and intended for a certain unit B into a substantially regular data flow. This data flow is thus transferred via the private reading bus BBR concerned to the unit B. In the case of writing, the memory interface INT converts a substantially regular data flow coming from a certain unit B into data bursts for writing in the collective memory SDRAM.

Figure 2:
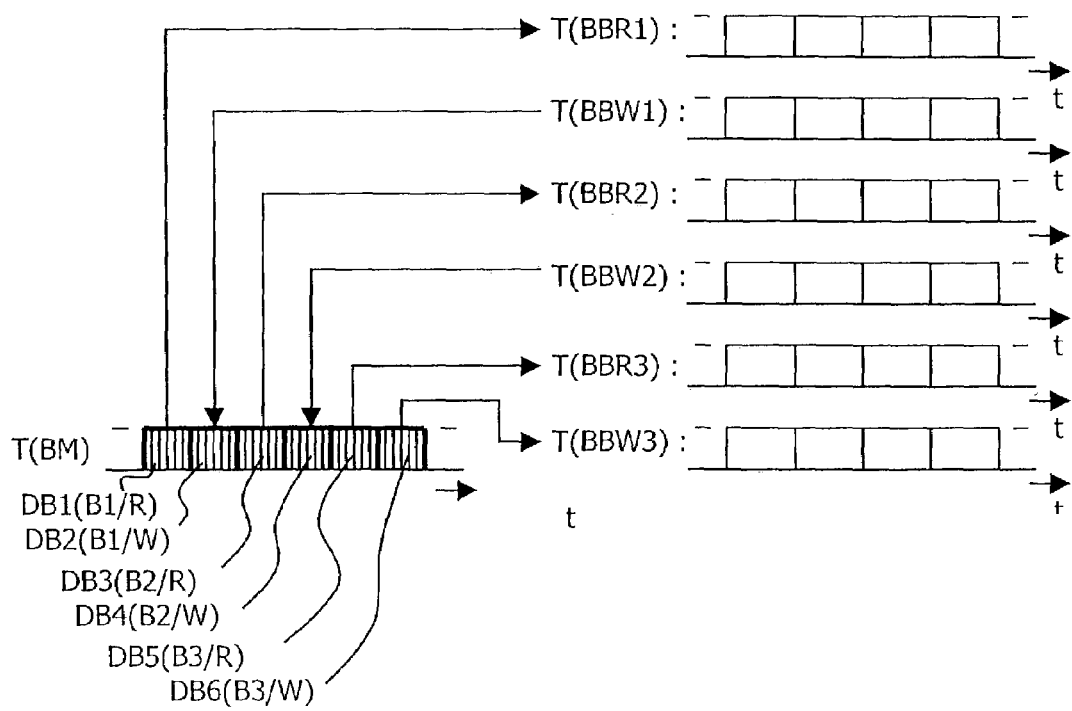
FIG. 2 illustrates the general functioning of the memory interface of the device.

FIG. 2 illustrates the functioning of the memory interface INT in a simple priority access scheme in which the unit B1 has priority over the unit B2, which has priority over the unit B3. This scheme therefore corresponds to what is done in the state of the art. T(BM) represents a data traffic on the collective bus BM between the collective memory SDRAM and the memory interface INT. T(BBR1), T(BBR2) and T(BBR3) represent respectively data traffics on the private reading buses BBR1, BBR2 and BBR3 between the memory interface INT and the units B1, B2 and B3. T(BBW1), T(BBW2) and T(BBW3) represent respectively data traffics on the private writing buses BBW1, BBW2 and BBW3 between the memory interface INT and the units B1, B2 and B3.

The data traffic T(BM) is composed of data bursts DB. Each data burst DB corresponds to an access to the collective memory SDRAM by a unit B either in write or read mode. The references between parentheses which follow DB indicate to which unit B the data in the burst belong and, in addition, the type of access: write (W) or read (R). For example DB1(B1/R) indicates that the data burst DB1 relates to access in read mode to the collective memory SDRAM by B1.

FIG. 2 illustrates that the memory interface INT effects a "smoothing" of the data bursts coming from the collective memory SDRAM and belonging to a certain unit B. This figure also illustrates that conversely the memory interface INT concentrates in time data coming from a unit B in order to write these data in the collective memory SDRAM in a burst (compacting of the data). The data traffics via the private reading buses BBR and the private writing buses BBW therefore have relatively low rates. Consequently this enables the private reading buses BBR and the private writing buses BBW to have relatively small bandwidths and this therefore enables these buses to have a relatively modest width. In this regard it should be noted that the size of a bus does not necessarily have to correspond to the number of bits contained in the data transferred by this bus. For example, a data item comprising 16 bits lets itself be divided into words of 4 bits. Thus it is possible to transfer this data item via a bus with a size of 4 bits in the form of a succession of 4 words.

Figure 3:
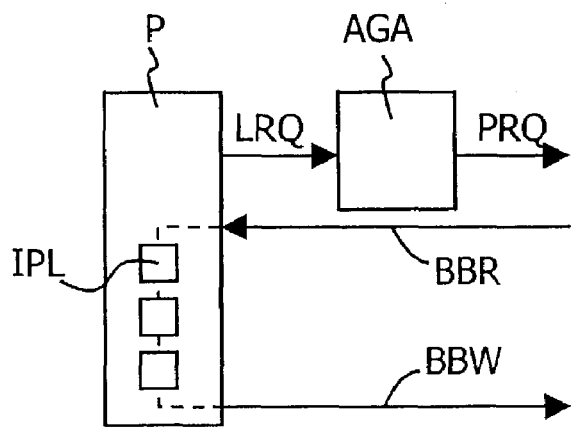
FIG. 3 illustrates a signal processing unit of the device.

FIG. 3 illustrates a unit B. The unit B comprises a processor P and a global addressing circuit AGA. The processor P makes logic requests LRQ. Let it be assumed that the unit B processes video data, and a logic request LRQ may for example be a request for pixels on a certain line in the current image. The global addressing circuit AGA transforms the logic request LRQ into a physical request PRQ. The physical request PRQ defines in the collective memory SDRAM the physical addresses under which the requested data are stored. The physical requests PRQ can have the following form: a starting address, the number of addresses to be sought from this address and possibly a scheme to be applied when the data are sought. The scheme can be defined in the form of: number of consecutive addresses to be read, number of addresses to be skipped and number of "read and jump" iterations. The AGA can be programmable so that translation parameters define the translations of the logic requests LRQ into physical requests PRQ. This affords flexibility in storage of the data in the collective memory SDRAM.

Figure 4:
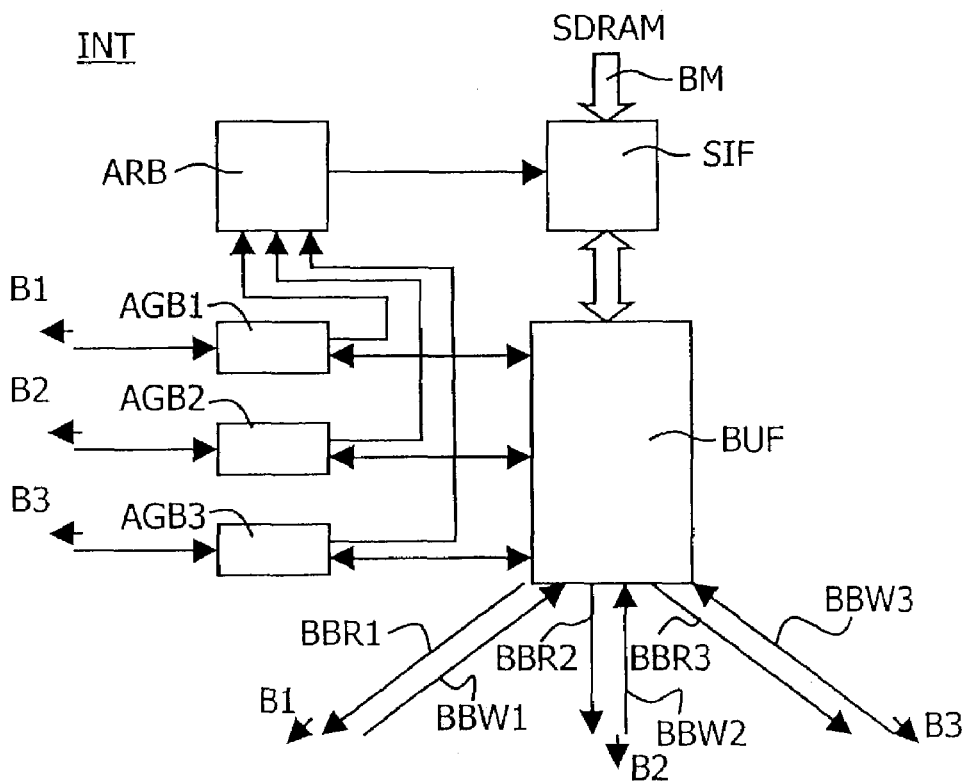
FIG. 4 illustrates the memory interface of the device.

FIG. 4 illustrates the memory interface INT. The memory interface INT comprises an arbitrator ARB, an access interface SIF, a buffer device BUF and macrocommand addressing circuits AGB. There is one macrocommand addressing circuit AGB for each unit B.

The internal functioning of the memory interface INT is overall as follows. Each macrocommand addressing circuit AGB divides a physical request from the unit B with which it is associated into macrocommands. A macrocommand represents a request for access to a certain line in the memory. Before a macrocommand is submitted to the arbitrator ARB, the macrocommand addressing circuit AGB checks whether there is sufficient room in the buffer device BUF. For this purpose, it first of all submits the macrocommand to the buffer device BUF. If the buffer device BUF confirms that there is room for storing the number of data defined by the macrocommand, the macrocommand addressing circuit AGB submits the macrocommand to the arbitrator ARB. The arbitrator ARB collects the macrocommands coming from the various macrocommand addressing circuits AGB and selects a macrocommand for sending to the access interface SIF. This selection is made according to an arbitration scheme which is described below. The access interface SIF processes the macrocommands coming from the arbitrator ARB in order of their reception. Thus the access interface SIF makes accesses to the collective memory SDRAM, the accesses being defined by the macrocommand currently being processed.

A macrocommand makes it possible to access X groups of addresses, each group containing Y addresses, the groups of addresses being separated from one another by Z words, X, Y and Z being integers. A macrocommand therefore contains the following information:

first address to be accessed;
number of addresses to be accessed following on from the first address in a group of addresses (Y−1);
number of addresses to be skipped between two consecutive groups of addresses (Z);
number of groups of addresses to be accessed in addition to the first group (X−1);
type of access: read or write.

One example of a macrocommand at the bit level is as follows. It is assumed that the data stored in the collective memory SDRAM are 32 bits wide and that the collective memory SDRAM has a maximum size of 256 Mbits. This means that an address is expressed in 23 bits. It is also assumed that the accesses are limited to a maximum size of 16 addresses. Such a limit is preferable from the latency point of view. Therefore X−1 and Y−1 equal 15 as a maximum and consequently can be coded in 4 bits. Finally, a line contains a maximum of 512 addresses according to the configuration of the collective memory SDRAM. Consequently the number of addresses to be skipped may not exceed 511 and therefore this number may be coded in 9 bits. The macrocommands therefore have a size of $23+2 \times 4+9+1=41$ bits. The address can be coded on bits 40 to 18, the type of access on bit 17, the number of words to be read (Y−1) on bits 16 to 13, the number of words to be skipped (Z) on bits 12 to 4, and the number of groups of words (X−1) on bits 3 to 0.

Examples of access interface of the memory interface, of a buffer device of the memory interface and of a buffer device for reading and writing are known and for example described in the patent cited previously.

Figure 5:
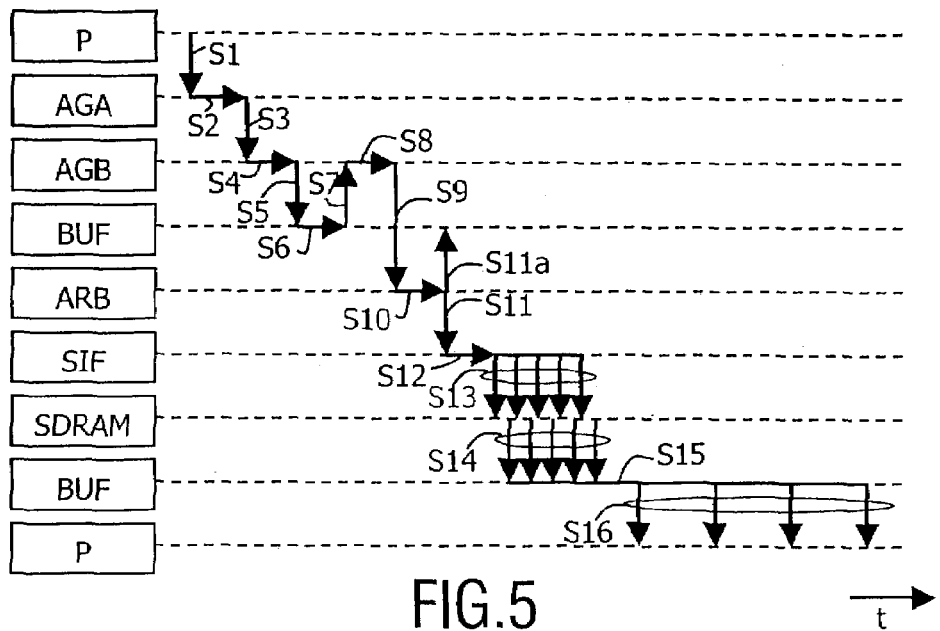
FIG. 5 illustrates an access in read mode of a unit.

FIG. 5 illustrates a procedure for access to the collective memory SDRAM in read mode by a certain unit B. The horizontal dimension represents time. The vertical dimension of this diagram represents the various functional elements which come into play. The diagram contains arrows. These arrows represent various steps S in the procedure for access to the interface memory SRAM.

S1=The processor P of the unit B concerned submits a logic request LRQ to the global addressing circuit AGA. The logic request LRQ specifies a subset of data, for example the luminance pixels of a line, in a set of data to be processed, for example an image.

S2=The global addressing circuit AGA converts the logic request LRQ into a physical request PRQ.

S3=The global addressing circuit AGA submits the physical request PRQ to the macrocommand addressing circuit AGB.

S4=The macrocommand addressing circuit AGB converts the physical request PRQ into macrocommands.

S5=The macrocommand addressing circuit AGB submits the first of the macrocommands derived from the physical request PRQ to the buffer device BUF.

S6=The buffer device BUF checks whether there is space for storing the number of data specified by the macrocommand.

S7=The buffer device BUF confirms to the macrocommand addressing circuit AGB that there is space ("acknowledges").

S8=Represents a certain amount of delay.

S9=The macrocommand addressing circuit AGB submits the macrocommand to the arbitrator ARB.

S10=The arbitrator ARB processes the macrocommand as a request for access to the collective memory SDRAM according to an arbitration scheme valid for all accesses by the units to the collective memory SDRAM. The invention relates to the structure of this arbitration diagram.

S11=The arbitrator ARB submits the macrocommand to the access interface SIF.

S11a=The arbitrator ARB indicates to the buffer device BUF that the macrocommand has been submitted to the access interface SIF ("acknowledgement").

S12=The macrocommand is waiting in the access interface SIF which first of all processes the previously received macrocommands.

S13=The access interface SIF generates control signals for the collective memory SDRAM at the basis of the macrocommand. These control signals have the effect that the data at the addresses specified by the macrocommand are read successively.

S14=The successively read data of the collective memory SDRAM are transferred to the buffer device BUF.

S15=The data are stored temporarily in the buffer device BUF.

S16=The buffer device BUF transfers the data to the processor in a substantially predictable way.

Steps S5-S15 are repeated for each macrocommand following the logic request LRQ made at step S1.

The following steps are not shown in FIG. 5. Following step S1, the global addressing circuit AGA sends a confirmation signal ("acknowledgement") to the processor P. This signal indicates that the logic request LRQ has been accepted and will be processed. In response to the confirmation signal, the processor P makes a new logic request and maintains it until a new order. When the macrocommand addressing circuit AGB submits the last macrocommand following the logic request LRQ, the processing of the logic request LRQ is complete. In this case, the macrocommand addressing circuit AGB sends a confirmation signal ("acknowledgement") to the global addressing circuit AGA indicating to the latter that the processing of the logic request LRQ is complete. In response, the global addressing circuit AGA will commence the processing of the new logic request LRQ in a similar fashion to the processing of the logic request LRQ made in step S1. In other words, history repeats itself. In write mode, the access procedure is similar except for steps S13 and S14, where the data are written instead of being read, and except that the macrocommands are of an access in write mode type instead of being of an access in read mode type.

In the functional systems as described in the introductory paragraph, it is possible to distinguish several kinds of functions which access the collective resource.

There are two major kinds of function. Firstly, functions sensitive to latency (waiting between two accesses) when they read or store data; these functions stop when they do not have any access (this is the case with the CPU). These functions can in general gain access in read mode and are connected to the memory interface INT, via a private reading bus BBR and a private writing bus BBW. Secondly, the functions with which it is possible to know in advance which data will be necessary and where these data are situated, these functions are performed by units containing buffers for making these functions insensitive to latency. Within these last functions insensitive to latency and which comply with a certain bandwidth in gaining access to the collective resource, there exist two kinds of function. First of all, critical functions, which generally gain access either in read mode or in write mode and are often connected to the collective resource by a single private bus either in read mode BBR or in write mode BBW, cannot wait for the data for very long. This is the case with display functions for example, which read pixels in the memory and present them at the output of the functional system. If the data are not accessible on time, the pixels cannot be displayed and the system presents a major error. Next, non-critical functions generally operate from the memory in read mode to the memory in write mode with data processing between the two. In general, these functions are connected to the memory interface INT via a private reading bus BBR and a private writing bus BBW. These functions relate for example to decoding, where a decoder may decode an image every 40 ms. The execution of such functions is presented by the dotted lines in FIG. 3. The non-critical processes present in fact a kind of internal pipeline IPL in which the data are processed. These processes gain in efficiency when their pipeline is permanently full and does not contain any "bubbles" in which there are no data.

It will easily be understood that these various kinds of units will require having access to the collective resource with different frequencies and regularities. There already exist access schemes for arbitrating accesses by units sensitive to latency and critical units. Such an access scheme is for example proposed in the European patent application published under the number EP1081603-A1 filed by the applicant. The access scheme proposed in the latter application can easily be combined with the present invention, the scheme proposed in that application being used for the functions with the highest priority and the scheme proposed in this invention for the functions with the lower priority. The invention fits within an access scheme which is overall of the priority type. Such an access scheme places the functions sensitive to latency and the critical functions in the levels with the highest priority in the order of priority. Possibly, as stated previously, the access of the priority functions is regulated according to a scheme according to the patent application EP1081603-A1. Then come the non-critical functions in the levels with the lowest priority. The aim of the invention is to regulate the use of the memory so as to avoid blockages and the presence of "bubbles" during which none of the functions accesses the collective resource and consequently during which the possibilities of access to the collective resource are badly used. These situations are in particular encountered with the lowest priority levels for which there is no function with a lower priority which can profit from the free memory accesses. Thus the invention relates in particular to the case of the non-critical units whose functioning it sets out to optimize.

For example, for a simple priority access scheme where three non-critical processes B1, B2, B3 share the three lowest priority levels, the following situation may occur:

B1 finishes its work first, then B2, and finally B3 can profit from the memory accesses but B3 alone may not be capable of profiting from all the accesses offered to it. To prevent this, either B3 must be capable of using the entire remaining bandwidth or the three processes must work more or less in parallel and consequently finish their work at the same time in order to distribute their accesses over time to the maximum possible extent. In this case, the three processes B1, B2 and B3 must be capable of taking the entire remaining bandwidth. This is because a system in which the non-critical units combined are capable of using the remaining bandwidth is always less expensive than a system in which B3 alone must be capable of using it since the condition is less restrictive. This is the type of situation that the invention sets out to resolve by proposing that the processes have different behaviors in read mode and write mode.

The invention uses an arbitrator ARB for managing access to the SDRAM by the various processes P described above. The arbitrator collects the access requests from all the processes P and selects one of them. A selected request enables the process which made this request either to write or read 16 words of 32 bits in the SDRAM. After this access to the SDRAM, the arbitrator selects another request, etc.

Figure 6:
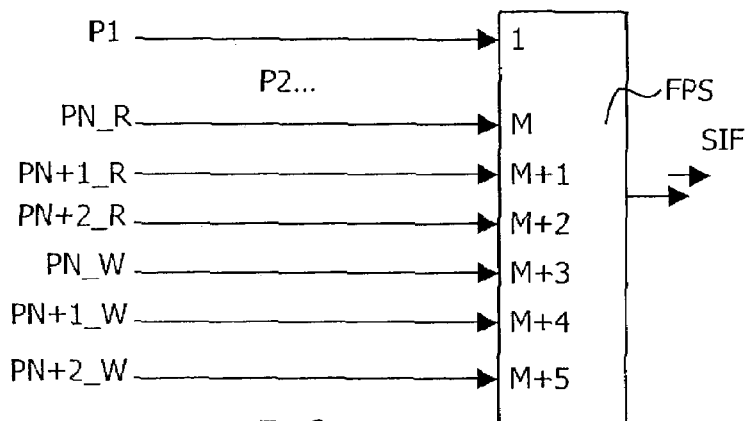
FIGS. 6 and 7 illustrate two embodiments according to the invention of an arbitrator for managing access to a collective memory by different processes.
Figure 7:
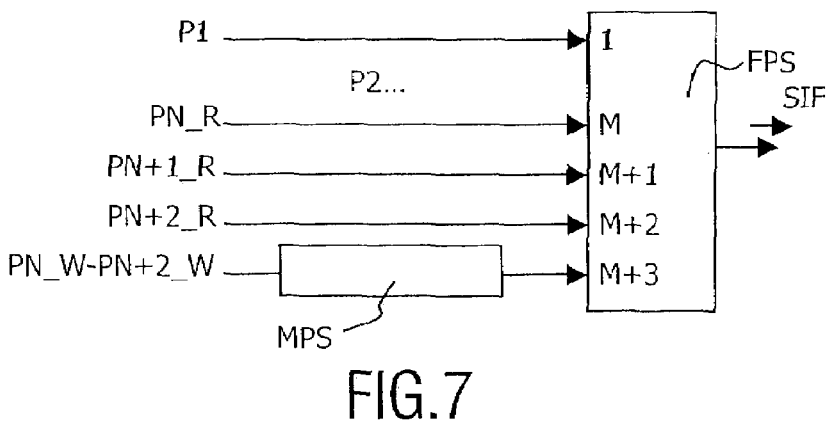

FIGS. 6 and 7 illustrate two embodiments of an arbitrator according to the invention for managing access to a collective memory by various processes. According to the invention, the functional system comprises an interface arranged to implement an access scheme including at least one state defined by an order of priority for an arbitration according to which the functions can access the collective resource, the state being characterized in that, for at least one set of at least two functions, the possibilities of access in read mode and the possibilities of access in write mode have different priority levels, the possibilities of access in read mode having consecutive priority levels higher than the priority levels of the possibilities of access in write mode.

Thus the invention guarantees that the functions will have different behaviors in read mode and write mode. This makes it possible to regulate the execution of the functions and to distribute the accesses by using in particular the duration of the data processing. This duration of the data processing is effectively a lapse of time between an access in read mode and an access in write mode during which the function which has read data processes them. According to the invention, the priority levels in read mode being higher than those in write mode, the functions each receive the data to be processed before any output of processed data for writing to the collective resource. Thus the invention enables the functions to have as far as possible data to be processed continuously and in parallel and for them to exploit their accesses more evenly since the output of the processed data is limited and therefore regulated by the accesses in write mode to the collective resource. The invention is particularly useful for controlling access of the non-critical functions to the collective resource.

A first embodiment of the invention illustrated in FIG. 6 uses an arbitrator comprising a fixed-priority selector FPS having M+5 inputs 1 to M+5, the number M being greater than or equal to 2. The requests for access to the SDRAM of the processes P1-PN−1 are managed according to a conventional order of priority and also according to optimized management methods as proposed for example in the patent cited previously. The dash between two processes P means all the processes whose reference number is included between the reference numbers of these two processes P. These processes P1-PN−1 are advantageously latency-sensitive processes or critical processes. The arbitration phase is implemented by testing the presence of a request on each priority level simultaneously and selecting the one which has a request and the highest level. Thus, as a priority, the arbitrator selects from amongst the processes a process P1-PN−1. If none of these processes has made a request, that is to say has not submitted any macrocommand to the arbitrator, the non-critical processes are handed over to; here they are three, PN, PN+1, PN+2, giving priority, according to the invention, to the macrocommands having an access type in read mode. These three processes constitute a set of at least two functions. Next the non-critical processes which have made a request in write mode are handed over to. This is shown in FIG. 6 by the letters R and W contiguous with the references of the non-critical processes PN, PN+1, PN+2. The sets "PN_R" and "PN_W" define two subsets of functions. Thus it will be noted clearly that the possibilities of access in write mode and read mode have different priority levels. The priority levels in write mode of the three processes PN, PN+1, PN+2 are inserted in a conventional order of priority after the priority levels in read mode of the three processes. This characteristic is essential to the invention. Since the macrocommand in read mode can be generated by a process only when there is room in its pipeline, the invention cannot cause blocking within said process. Next the selected request is transmitted to the SIF. It will be understood here how the scheme of accesses to the memory depicted in FIG. 2 will change. First of all the processes will one after the other make an access in read mode and then one after another they will make an access in write mode. However, this embodiment can still cause a blockage and not make it possible to avoid all cases where the memory accesses are underused. This is because the strict order of priority used in the latter embodiment may cause blockages preventing accesses in write mode of the third process. Thus this last embodiment does not make it possible for the processes of the set of at least two functions to finish their work at the same time.

An advantageous embodiment illustrated in FIG. 7 uses an arbitrator comprising a fixed-priority selector FPS having M+3 inputs 1 to M+3, the number M being greater than or equal to 2, and a process selector MPS. The requests for access to the SDRAM of the processes P1-PN−1 are managed in a conventional order of priority or according to optimized management methods as proposed for example in the patent cited previously. These processes P1-PN−1 are advantageously latency-sensitive processes or critical processes. The arbitration phase is implemented by testing the presence of a request on each priority level simultaneously and, where applicable, selecting the one which has a request and the highest level. This is because the requests are submitted simultaneously (when they exist) on the inputs of the fixed-priority selector FPS. Thus, in priority, the arbitrator selects a process P1-PN−1 from amongst these processes. If none of these processes has made a request, that is to say has not submitted a macrocommand to the arbitrator, the non-critical processes are handed over to; here, they are three, PN, PN+1, PN+2, defining a set of at least two functions, giving priority, according to the invention, to the macrocommands having an access type in read mode. Next the processes which have made a request in write mode are handed over to. This is shown in FIG. 7 by the letters R and W contiguous with the references of the processes PN, PN+1, PN+2. The sets PN_R and PN_W define subsets of functions. In the embodiment presented in FIG. 7, only one priority level M+3 is allocated for the three non-critical processes in write mode. In other words, the subset of functions PN_W share with each other the same priority level M+3. This priority level is given to the process selected in the process selector MPS which receives the access requests in write mode to the SDRAM of the processes PN-PN+2. It selects a process P from amongst these processes. This selection takes place according to a scheme which will be described in more detail hereinafter. If the process P selected has made a request in write mode, this request will be transmitted to the input M+3 of the fixed-priority selector FPS. Otherwise no request is transmitted to this input for arbitration. Therefore, if none of the processes which has a higher priority level has made a request, none of the three non-critical processes has made a request in read mode and the process P selected by the process selector MPS has made a request, this request will be selected. If there is not such a request, the possibility of access is not used. In all cases in which the arbitration proposes a possibility of access to the priority level M+3, whether or not there is access, the process selection within the process selector MPS changes in order to select another process from the subset PN_W-PN+2_W. Here therefore several states (I) are run through, a state (I) being defined by an order of priority serving for an arbitration and in which at least one priority level constitutes a possibility of access for one of the functions belonging to a subset of functions, here PN_W-PN+2_W, sharing the same priority level, here M+3, on several states (I). This is because to each arbitration there can be attached a state I to which there corresponds the order of priority comprising P1 to PN−1, PN_R to PN+2_R and the process selected within PN_W to PN+2_W. Each of the processes PN_W to PN+2_W is therefore selected in turn during the run through several states (I), the number of states (I) run through in order to make a complete "tour" of the processes in write mode depending on the frequency of the accesses proposed to the priority level M+3. This is because the frequency of the accesses proposed to the level M+3 determines the frequency of change in selection within the selector MPS. This shared priority level can also be envisaged with however fewer advantages for grouping together the access possibilities of the processes in read mode.

This advantageous embodiment makes it possible to carry out an arbitration on fewer priority levels than the previous embodiment and is therefore faster and simpler. In addition, this embodiment enables the functions to work in write mode in parallel without causing any blockage and thus optimizing the use of the accesses to the collective resource. This is because, according to the latter advantageous embodiment, the non-critical functions finish their work at the same time.

Figure 8A:
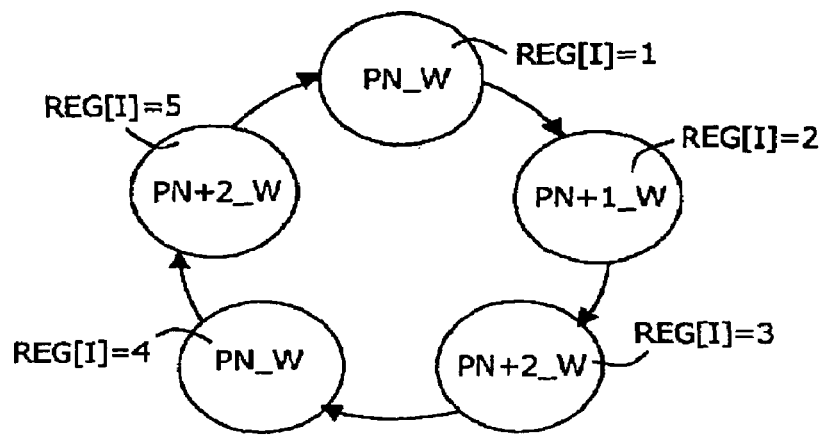
FIGS. 8A and 8B illustrate access arbitration for a collective memory implemented in the second embodiment according to the invention of an arbitrator presented in FIG. 7.
Figure 8B:
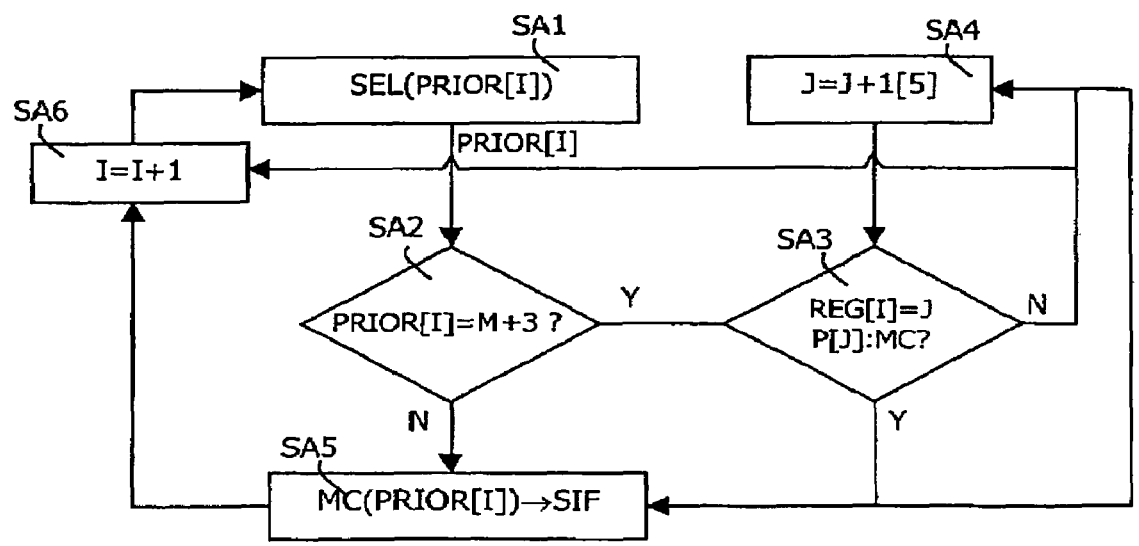

A preferred embodiment describes more precisely the functioning of the process selector described in more detail in FIGS. 8A and 8B.

In the preferred embodiment, the same priority level M+3 constitutes an access possibility in shared writing mode, on the run through several states I, between the access possibilities in write mode of a subset of functions PN_W to PN+2_W. FIG. 8A illustrates a possibility of functioning of the process selector MPS. A register REG is consulted at each arbitration for a state I where the priority level M+3, common to a set of at least two functions, consisting of the processes PN-PN+2, within the process selector MPS, is questioned. To each value of the register there corresponds a function, here PN_W, PN+1_W or PN+2_W. This register can be implemented on one, two, three bits or more according to the number of methods which it is wished to see function in parallel and/or the number of times where it is wished to see a given process appear on a complete "tour" of the values of the register. Thus FIG. 8A depicts five register values 1 to 5 in the form of circles. According to the invention only one non-critical process in write mode is looked at per state, several consecutive states being however able to have the same non-critical process in write mode to look at in the arbitration. This is because the register is not incremented at each change of state but only when the priority level concerned has an access possibility. These values are run through one after the other cyclically. Each value represents the selection of one of the processes. The relative distribution of the accesses between the various processes in write mode can also be controlled via the structure of this register. This is because, by assuming that three processes PN_W, PN+1_W and PN+2_W share with each other the priority level M+3 and the bandwidths on their writing bus are respectively 40 Mbytes/s, 20 Mbytes/s and 40 Mbytes/s, it is useful to give ⅖ of the bandwidth to the processes PN_W and PN+2_W and ⅕ to PN+1_W. This distribution is illustrated in FIG. 8A, where the register can take 5 different values: 2 for PN_W, 2 for PN+2_W and 1 for PN+1_W. An additional advantage of this distribution is that, when one of the processes requires no access (for example PN+1), the bandwidth available for the non-critical processes tends to be distributed naturally half and half for PN and PN+2. If PN requires no access, the bandwidth will tend to be distributed at one third for PN+1 and two thirds for PN+2. This is due to the fact that, even if the process selected in the MPS does not make access, the register value is incremented. Here the register is therefore advantageously used on three bits. The number of states (I) required for running through the cycle in FIG. 8A depends on the frequency of the accesses of the non-critical functions in write mode, that is to say the frequency of the questioning of the priority level M+3 in this example.

FIG. 8B illustrates more precisely how the selection takes place within the selector MPS and how movement takes place from one state to another in FIG. 8B. In this figure it is considered that the access of the processes P1 to PN−1 is managed in a simple order of priority in which the highest priority level is selected. Step SA1 is the first step made after a jump from a state I to a state I+1. Thus, in a first step SA1, the fixed-priority selector FPS for the arbitration in the present state I selects a priority level PRIOR[I]. If at least one request is present on the priority levels 1 to M+2, the priority level corresponding to the smallest number is selected, otherwise it is the level M+3 which is selected by default. In a step SA2, the priority level is compared with M+3. If the priority level is different from M+3, access to the memory is granted to the macrocommand MC in a step SA5 and then the following state I+1 is passed to in a step SA6 for a new arbitration, which entails the method depicted by FIG. 8B being repeated. If the priority level is equal to M+3, a step SA3 looks at the value of the register REG[I] for the present state I and looks to see whether the process corresponding to the value of the register has presented a macrocommand MC. If the process has presented a macrocommand MC, access is granted to this macrocommand MC corresponding to the priority level PRIOR[I] in a step SA5 and the value of the register REG is incremented to J+1 modulo 5 in a step SA4, and the system passes to the following state I+1 in a step SA6. If the process has not presented a macrocommand, the register is incremented to J+1 modulo 5 in a step SA4, so that access is offered to another process at the following state and the system passes to the following state I+1 in a step SA6.

With an arbitration as proposed in this preferred embodiment, it is possible to have maximum use of the collective resource if the sum of the average bandwidths used by all the processes (latency-sensitive, critical and non-critical) is less than the available bandwidth and the peak bandwidth (instantaneous bandwidth) for all the non-critical processes is greater than the available bandwidth.

In the preferred embodiment, the advantages of the invention are as follows: there are no wasted access possibilities, the non-critical processes are always ready to take the free access possibilities, all the non-critical processes finish their work at the same time and the pipelines of the non-critical functions are always full.

Figure 9:
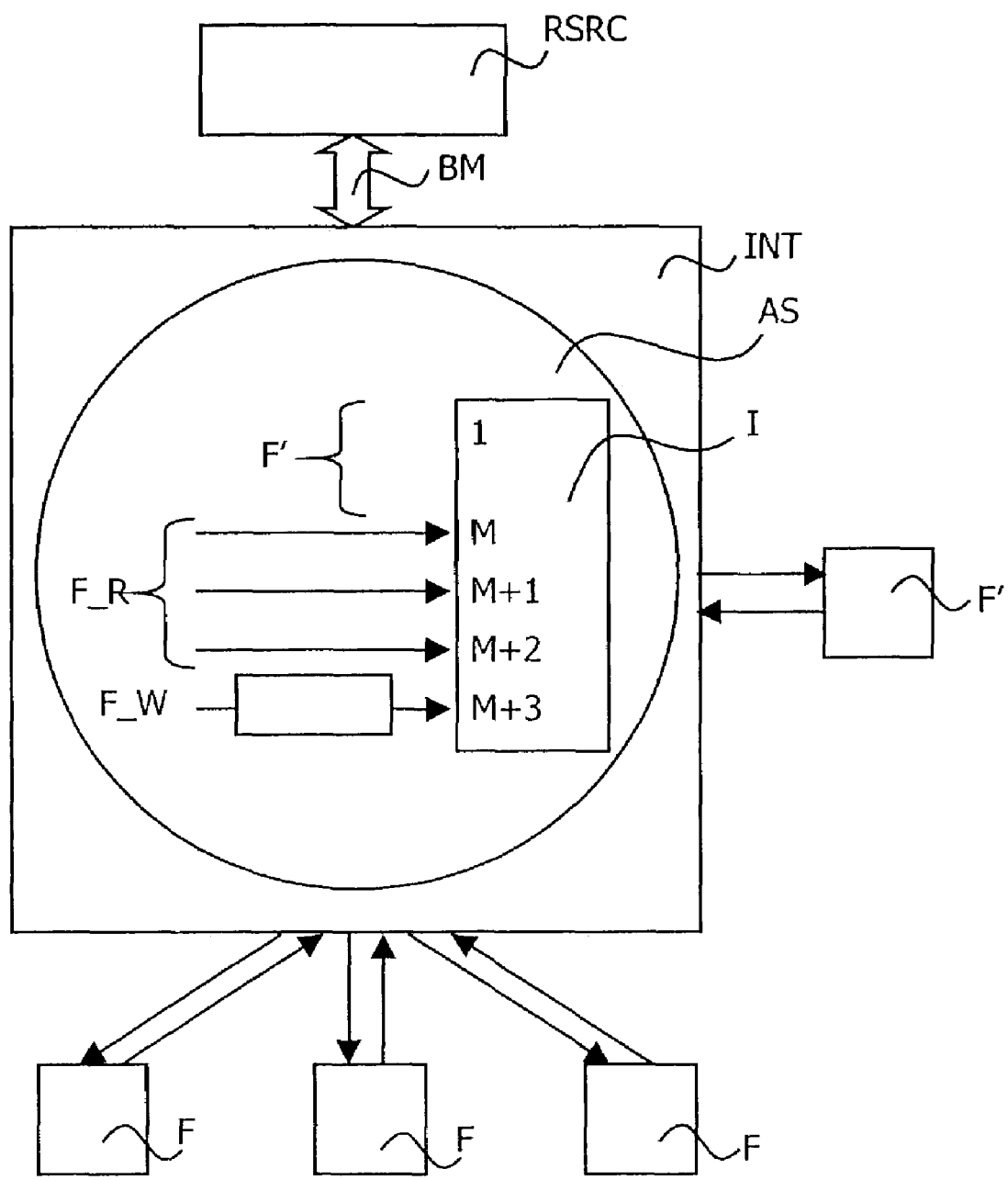
FIG. 9 illustrates basic characteristics of the invention.

FIG. 9 illustrates basic characteristics of the invention as disclosed in the "summary of the invention" part. A functional system comprises a set of functions F, F' which are to access a collective resource (RSRC). The system comprises at least one state (I) defined by an order of priority for an arbitration according to which the functions (F, F') can access the collective resource (RSRC), the state (I) being characterized in that, for at least one set of at least two functions (F), the access possibilities in read mode F_R and the access possibilities in write mode F_W have different priority levels, the access possibilities in read mode having consecutive priority levels higher than the priority levels of the access possibilities in write mode.

The data processing device described above with reference to FIGS. 1 to 8 is an example of an implementation of the basic characteristics illustrated in FIG. 9. The collective resource RSRC illustrated in FIG. 9 is implemented in the form of the collective memory SDRAM illustrated in FIG. 1. The functions F, F' illustrated in FIG. 9 are implemented in the form of units B illustrated in FIG. 1. The memory interface INT illustrated in FIG. 1 implements an access method illustrated in FIGS. 8A and 8B. This access scheme is characterized by a variable plurality of states which run through the register values illustrated in FIG. 8A. The extent of the access possibilities using a macrocommand is 16 memory addresses. Each state defines an order of priority by means of which arbitration is carried out, arbitration according to which a unit B can access the collective memory SDRAM. This order of priority can be the same in all the states (I), which is what is presented in FIG. 6, or be modified on each occasion that an access possibility is granted to the lowest priority level, this is illustrated in FIG. 7.

The invention can be applied in an integrated circuit comprising an MPEG decoder and other circuits for the processing and display of images. In such an integrated circuit various processes take place, a process being the equivalent of a function. There are various processes P which are to access a collective memory of the SDRAM type, called SDRAM hereinafter:

P1: DISP (Display)
P2: OSD (On Screen Display)
P3: BCKGND (Background)
P4: CCIR656
P5: VMIX (Video Mixer)
P6: AUDIOFIFO (Audio FIFO Read and Write)
P7: AUDIOBUF (Audio Buffer Read and Write)
P8: VFW (Video FIFO Write)
P9: VFR (Video FIFO Read)
P10: MC (Motion Compensation)
P11: DMU
P12: INTERP The process P1 (DISP) relates to the display of the decoded images. The process P2 (OSD) relates to the display of graphical data overprinted on a displayed decoded image. The process P3 (BCKGND) relates to the display of a fixed image on the screen background or in transparency with a decoded and processed image. The process P4 (CCIR656) relates to an input of the integrated circuit making it possible to receive images already decoded and to store them in memory. These images can be displayed instead of the images coming from the MPEG decoding by means of the process P1 (DISP). The process P5 (VMIX) relates to the mixing of three data flows coming from the processes P1 (DISP), P2 (OSD) and P3 (BCKGND). The processes P8 (VFW), P9 (VFR) and P6 (AUDIOFIFO) relate to the writing and reading of coded video and audio data extracted from an MPEG data flow by means of an unscrambling/demultiplexing device. The process P7 (AUDIOBUF) relates to the writing and reading of intermediate results of an audio processor. The process P10 (MC) relates to the movement compensation which constitutes a step in the MPEG video decoding. The process P11 (DMU) relates to an acceleration device which serves to make relatively complex manipulations on data in the SDRAM such as, for example, a movement of one or more data blocks or a filtering. The process P12 (INTERP) concerns the last part of an MPEG decoding which supplies decoded images to be written in the SDRAM with a view to their display or their use as reference images or both. The processes P8 to P 12 are not critical and their accesses to the collective resource can therefore be managed according to the invention. If the first processes P1 to P7 are in a conventional order of priority in the access scheme then M=8, the accesses in read mode of the processes P8 to P12 are on priority levels 8 to 12 and then the accesses in write mode of the processes P8 to P12 are grouped together on priority level 13 with a distribution over a cycle as presented in FIG. 8a.

The above description with reference to the figures illustrates the invention rather than limiting it. It is clear that there are many alternatives which come within the scope of the accompanying claims. In this regard, a few remarks are made in conclusion.

The invention can be applied in any functional system. FIG. 1 illustrates only one example according to which the invention is applied in a data processing device. It is also possible, for example, to apply the invention in a communication system comprising a central server and a plurality of terminals. The invention can be applied in order to manage access to the central server by the terminals in an advantageous way.

There are many ways for implementing functions by means of physical articles (items of hardware) or software or a combination of the two. In this regard, the figures are highly schematic, each figure representing only one embodiment. Therefore, although a figure shows various functions in the form of separate units, this does not at all exclude a single physical article or item of software performing several functions. This in no way excludes the fact that a function can be performed by a set of physical articles or items of software.

For example, the memory interface illustrated in FIG. 4 comprises various units which, in combination, control access to the collective memory and which control the memories comprised in the memory interface. In principle it is possible to implement these units by means of a suitably programmed computer circuit. A set of instructions contained in a programming memory can cause the computer circuit to perform the various operations described above with reference to FIGS. 1-8. The set of instructions can be loaded in the programming memory by reading a data carrier such as for example a disk which contains the set of instructions. The reading can be carried out by means of a communication network such as for example the Internet. In this case a service provider will make the set of instructions available to interested parties.

No reference sign between parentheses in a claim should be interpreted limitingly. The word "comprising" does not exclude the presence of other elements or steps listed in a claim. The word "a" or "one" preceding an element or step does not exclude the presence of a plurality of these elements or steps.

What is claimed is:

1. A method of managing access to a collective resource, the method comprising:
   collecting, by an arbitrator, a plurality of access requests for accessing the collective resource; and
   performing, by a fixed-priority selector and a process selector included in the arbitrator, an arbitration function using a fixed-priority order to determine which access request to grant access to the collective resource, the step of performing the arbitration function comprising:
      selecting, by the process selector, a single access request from the plurality of access requests, the process selector using a first selection process to select the single access request when the plurality of access requests consists only of access requests possessing a lowest priority level, the lowest priority level comprising latency-insensitive, noncritical processes in write mode,
      forwarding, by the process selector, the selected single access request to the fixed-priority selector, and
      granting, by the fixed-priority selector, access to the collective resource for a single access request from the plurality of access requests, the fixed-priority selector using a second selection process to select the single access request possessing a highest priority level using the fixed-priority order.

2. The method of claim 1, wherein the highest priority level includes latency-sensitive and latency-insensitive critical processes requesting access to the collective resource.

3. The method of claim 1, wherein the step of selecting, by the process selector, further comprises:
   using a register to select the single access request, wherein the process selector uses a register value to select the single access request.

4. The method of claim 3, further comprising:
   incrementing, by the process selector, the register value when the latency-insensitive, noncritical process in write-mode corresponding to the register value does not require access to the shared memory; and determining, by the process selector, whether a single access request based on the incremented register value requires access to the shared memory.

5. An arbitrator for managing access to a collective resource, the arbitrator comprising:
- a process selector for selecting a single access request from a plurality of access requests, the process selector using a first selection process to select the single access request when the plurality of access requests consists only of access requests possessing a lowest priority in a fixed-priority order, the lowest priority level comprising latency-insensitive noncritical processes in write mode, and
- a fixed-priority selector for granting access to the collective resource for a single access request from the plurality of access requests, the fixed-priority selector using a second selection process to select an access request using the fixed-priority order, wherein the fixed-priority selector selects the access request possessing a highest priority,
- wherein an output of the process selector is a lowest priority input of the fixed-priority selector.

6. The arbitrator of claim 5, wherein the highest priority level includes latency-sensitive and latency-insensitive critical processes requesting access to the collective resource.

7. The arbitrator of claim 5, further comprising:
- a register for selecting a single access request, wherein the process selector uses a register value to select the single access request.

8. The arbitrator of claim 7, wherein the process selector increments the register value when the latency-insensitive, noncritical process in write-mode corresponding to the register value does not require access to the shared memory and determines whether a single access request based on the incremented register value requires access to the shared memory.

9. A system for managing access to a collective resource, the system comprising:
- a process selector for selecting a single access request from a plurality of access requests, the process selector using a first selection process to select the single access request when the plurality of access requests consists only of access requests possessing a lowest priority in a fixed-priority order, the lowest priority level comprising latency-insensitive noncritical processes in write mode, and
- a fixed-priority selector for granting access to the collective resource for a single access request from the plurality of access requests, the fixed-priority selector using a second selection process to select an access request using the fixed-priority order, wherein the fixed-priority selector selects the access request possessing a highest priority,
  - wherein an output of the process selector is a lowest priority input of the fixed-priority selector; and
- an access interface for processing access requests received from the arbitrator and sending the access requests to the collective resource in order of receipt from the arbitrator.

10. The system of claim 9, wherein the highest priority level includes latency-sensitive and latency-insensitive critical processes requesting access to the collective resource.

11. The system of claim 9, further comprising:
- a register for selecting a single access request, wherein the process selector uses a register value to select the single access request.

12. The system of claim 11, wherein the process selector increments the register value when the latency-insensitive, noncritical process in write-mode corresponding to the register value does not require access to the shared memory and determines whether a single access request based on the incremented register value requires access to the shared memory.

* * * * *